United States Patent [19]
Morain et al.

[11] 3,941,145
[45] Mar. 2, 1976

[54] SAFETY VALVE

[75] Inventors: Eldon W. Morain; Judson C. Cole, both of Tulsa, Okla.

[73] Assignee: Continental Industries, Inc., Tulsa, Okla.

[22] Filed: Aug. 5, 1974

[21] Appl. No.: 494,567

[52] U.S. Cl. ............... 137/318; 137/454.5; 137/460
[51] Int. Cl.² ........................................... F16K 43/00
[58] Field of Search ........... 137/317, 318, 460, 455, 137/456, 458, 519.5, 454.5, 533.11, DIG. 2; 251/216, 291

[56] References Cited
UNITED STATES PATENTS

| | | | |
|---|---|---|---|
| 1,785,475 | 12/1930 | Bliven | 215/216 |
| 3,211,173 | 10/1965 | Mueller et al. | 137/454.5 |
| 3,247,862 | 4/1966 | Burke | 137/318 |
| 3,272,211 | 9/1966 | Leopold Jr. et al. | 137/318 |
| 3,692,044 | 9/1972 | Wise | 137/318 |

FOREIGN PATENTS OR APPLICATIONS

| 549,830 | 11/1922 | France | 251/216 |
|---|---|---|---|

*Primary Examiner*—Henry T. Klinksiek
*Attorney, Agent, or Firm*—Head, Johnson and Chafin

[57] ABSTRACT

A safety valve for pressure fluid flow lines and which may be utilized in combination with a punch tee, said valve being responsive to pressure differentials acting thereacross for automatically closing to preclude accidental loss of pressure fluid from the line. The valve comprises body means adjustably secured in communication with the pressure fluid of the flow line, valve seat means provided on the body means, cage means carried by the body means, ball means loosely disposed in the cage means to provide a normally open position for the valve and responsive to pressure differentials thereacross for automatically engaging the valve seat to provide a closed position for the valve, locking means adjustably disposed in the proximity of the body means for providing a predetermined positioning or setting for the body means for calibrating the pressure responsive sensitivity for the ball means, and means for selectively opening the valve against said closing pressure differential.

6 Claims, 11 Drawing Figures

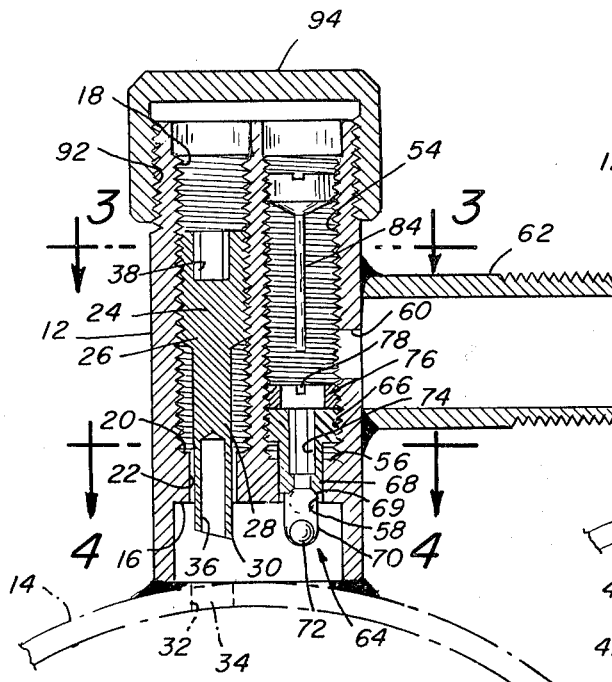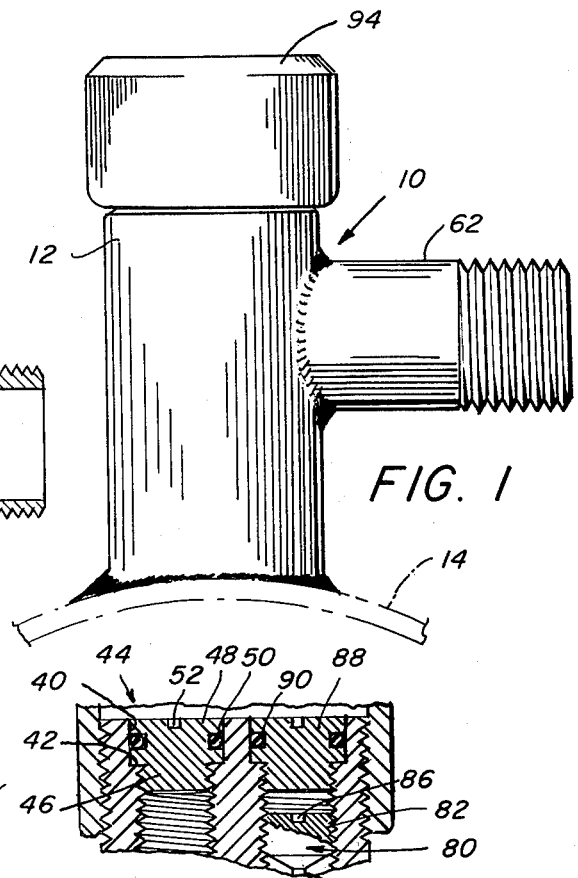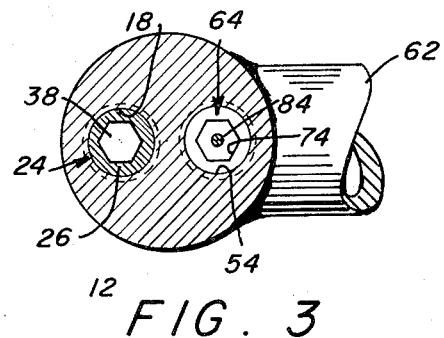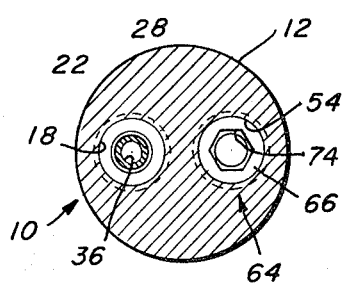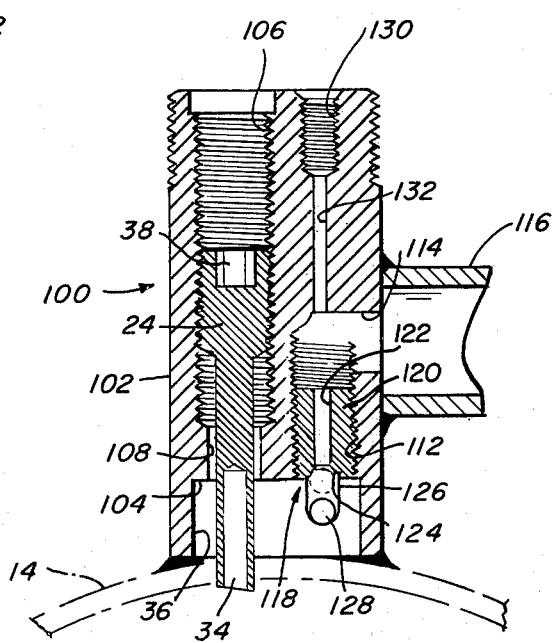

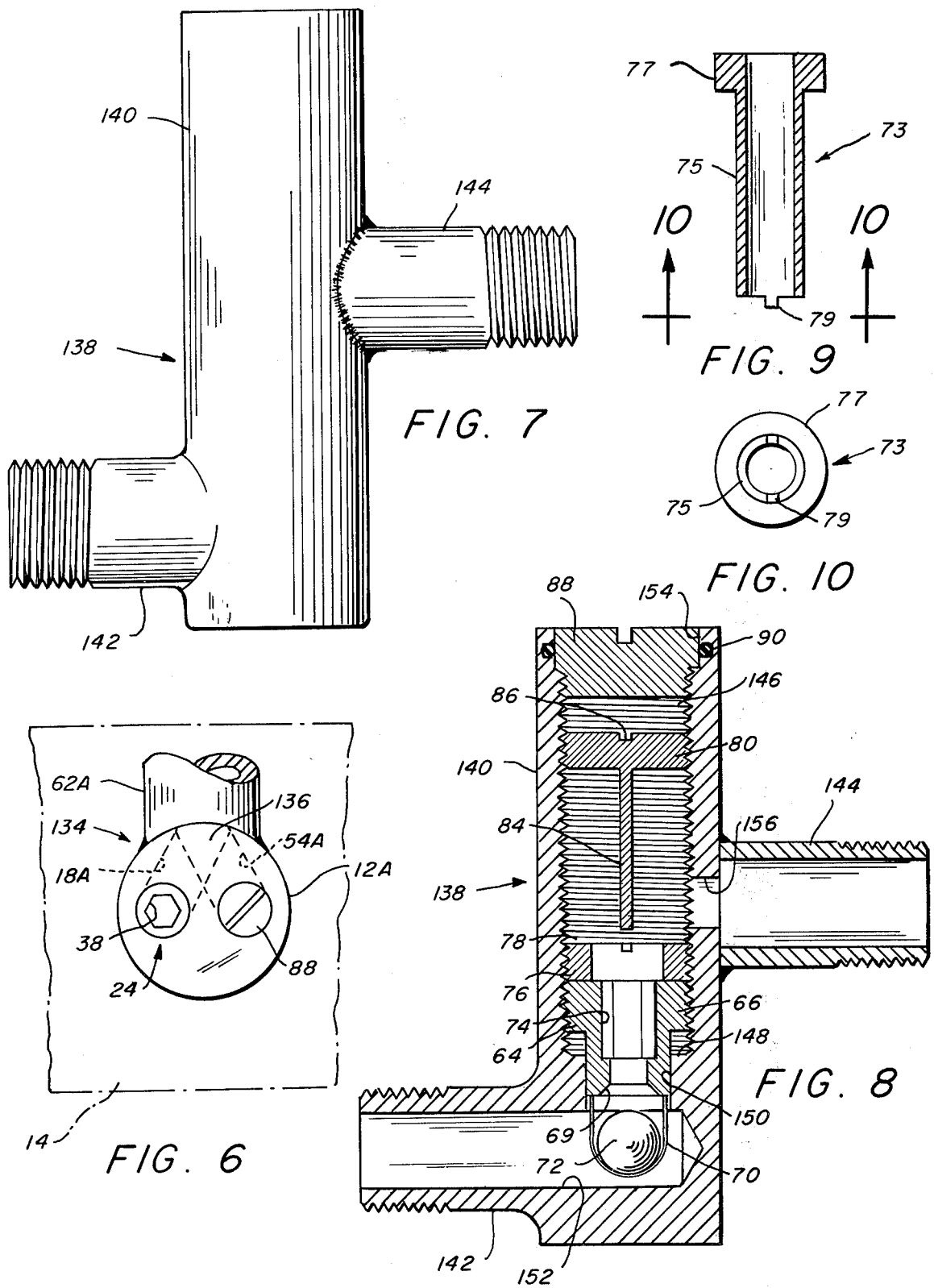

SAFETY VALVE

BACKGROUND OF THE INVENTION

1. Field of the Invention

This invention relates to improvements in safety valves and more particularly, but not by way of limitation, to a safety valve for a pressure fluid flow line, and which may be utilized in combination with a punch tee, for automatically closing upon the sensing of pressure differentials thereacross for precluding accidental loss of the pressure fluid from the flow line.

2. Description of the Prior Art

It is frequently desirable to connect a main pressure fluid flow line with a secondary flow line in order to transport a portion of the pressure fluid to an auxiliary site. For example, in the fuel supply system of a city, such as the gas distribution system, it is frequently desirable to connect a new building or house to the gas distribution system in order to supply the new building with fuel. It is common practice to weld or otherwise secure a punch tee, or the like, to the outer periphery of the pipeline of the distribution system, and seal said fitting between the pipeline and an auxiliary flow line which extends to the building to be newly supplied with the fluid or fuel. Subsequent to the setting of the punch tee, a punch member is utilized for cutting or puncturing the outer periphery of the pipe to provide communication between the main pipeline and the auxiliary flow line through the punch tee. There are certain disadvantages in the presently available punch tees, however, in that in the event of a break in the auxiliary line, the pressure in the auxiliary line may drop suddenly and tend to quickly withdraw substantially great quantities of the fluid from the main pipeline. It will be readily apparent that such a situation may be extremely hazardous, particularly in the event the main distribution system carries natural gas, or the like.

SUMMARY OF THE INVENTION

The present invention contemplates a novel safety valve which is particularly designed and constructed for overcoming the above disadvantages. The valve may be utilized in combination with the usual punch tee, or may be interposed between substantially any two flow lines wherein it is desired to protect at least one of the lines against a sudden pressure drop or other lessen of pressure in the other of said lines. The novel valve comprises a body portion adjustably secured in a suitable fitting which in turn is connected to a flow line in such a manner as to provide communication between the interior of the flow line and the safety valve. A valve seat is provided in the body portion and a ball and cage member is carried thereby with the ball being loosely disposed within the cage member to provide a normally open position for the valve. However, the ball member is responsive to pressure differentials acting thereacross to automatically close the valve when the pressure on one side thereof is sufficiently greater than the pressure on the opposite side thereof to preclude accidental loss of pressure fluid from the flow line. Locking means is adjustably secured in the fitting for providing a preselected positioning or setting of the valve body in order to calibrate the operation of the ball member in order to regulate the closing pressure thereof. In addition, an opening member is movably secured to the fitting for selectively opening the ball member against the closing pressure when it is desired to re-establish open communication between the main flow line and a secondary flow passageway.

Of course, the safety valve may be utilized in combination with the usual punch tee which is secured between a fluid pressure line and a secondary or auxiliary line in such a manner that the punch may be utilized for piercing or cutting the pipe in order to provide communication between the interior of the main flow line and the secondary flow line. The safety valve may be interposed between the main flow line and secondary flow line for directing the fluid therebetween in one direction. In the event there is a failure in the auxiliary line, which causes an undesirable drop of fluid pressure therein, such as a break in the line, the pressure differentials acting on the ball member of the safety valve will cause the ball to close against the valve seat and preclude loss of pressure fluid from the main flow line. When the failure situation has been corrected or repaired and it is desired to re-establish communication between the main flow line and the auxiliary line, the opening member may be utilized for opening the ball member against the closing pressure and permitting the fluid to flow therethrough and equalize the pressure acting on the ball member whereby the valve will remain in the open position until some pressure differential situation again occurs which closes the safety valve.

BRIEF DESCRIPTION OF THE DRAWINGS

FIG. 1 is a side elevational view of a combination safety valve and punch tee fitting illustrated in a position of a flow line, which is indicated in broken lines and having portions eliminated for purposes of illustration.

FIG. 2 is a sectional elevational view of the combination punch tee and safety valve of FIG. 1.

FIG. 2A is an enlarged view of the upper portion of the combined safety valve and punch tee fitting shown in FIG. 1.

FIG. 3 is a sectional view taken on line 3—3 of FIG. 2.

FIG. 4 is a sectional view taken on line 4—4 of FIG. 2.

FIG. 5 is a view similar to FIG. 2 depicting a modified embodiment of the combination and safety valve punch tee fitting.

FIG. 6 is a top view of a modified arrangement for the punch member and safety valve for the combination safety valve and punch tee fitting.

FIG. 7 is a side elevational view of a safety valve fitting adapted to be interposed between the first and second flow lines.

FIG. 8 is a sectional elevational view of the safety valve fitting shown in FIG. 7.

FIG. 9 is a sectional elevational view of a setting tool for a locking ring utilized in combination with the safety valve of the invention.

FIG. 10 is a view taken along line 10—10 of FIG. 9.

DESCRIPTION OF THE PREFERRED EMBODIMENTS

Referring to the drawings in detail, and particularly FIGS. 1 through 4, reference character 10 generally indicates a combination safety valve and punch tee fitting comprising a housing 12 which may be secured to the outer periphery of a suitable flow line 14 (indicated in broken lines) in any suitable manner, such as by welding, or the like. A central recess 16 is provided in one end of the housing in open communication with the outer periphery of the pipe or flow line 14 for providing a sealed chamber for a purpose as will be hereinafter set forth. A first offset threaded bore 18 extends longitudinally in the housing 12 terminating at an inwardly directed annular shoulder 20 which is conterminous with a reduced diameter smooth-walled bore 22 providing communication between the bore 18 and the recess 16 for a purpose as will be hereinafter set forth.

A punch member 24 is threadedly secured within the bore 18 and whereas the punch member 24 may be of any suitable type, as shown herein, the punch member 24 comprises a stem member 26 having the outer periphery thereof threaded for engagement with the threaded bore 18 and having a reduced diameter punching element 28 extending longitudinally outwardly therefrom in a direction toward the flow line or pipe 14. The outer extremity 30 of the punching element 28 is a cutting edge of any suitable type whereby movement of the punch member 24 in a direction toward the pipe 14 a sufficient distance will cause the cutting edge 30 to penetrate the wall of the pipe 14 as shown in dotted lines at 32. As the punch element 28 cuts the pipe 14 at 32, a segment 34 thereof, commonly called a coupon, is severed from the pipe 14, and a longitudinally extending bore 36 is provided in the outer end of the punching element 28 for frictionally engaging and retaining the coupon 34 therein, as is well known. A hexagonal bore 38, or the like, is provided in the outer end of the punch stem 26 for receiving a suitable tool (not shown) therein, such as an allen wrench, or the like, for transmitting rotation to the punch member 24, as is well known.

The outer end of the bore 18 is enlarged at 40 to provide an annular shoulder 42 therein. A suitable seal plug 44 is threadedly secured in the bore 18 and as shown herein comprises a threaded shank member 46 threadedly secured to the bore 18 and an enlarged head portion 48 in engagement with the shoulder 42. Suitable sealing means such as an O-ring 50, is interposed between the outer periphery of the head portion 48 and the enlarged bore portion 40 for precluding leakage of fluid therebetween. A diametrically extending groove or recess 52 is provided on the exposed outer surface of the head portion 48 whereby a screw driver or the like (not shown) may be utilized for inserting the plug 44 into the bore 18 and withdrawing the plug 44 therefrom, as is well known. The plug 44 and enlarged bore 40 are omitted in FIG. 1 for purposes of illustration.

A second offset bore 54 extends longitudinally in the housing 12 substantially parallel to the bore 18 and terminates at an inwardly directed shoulder 56. A reduced diameter smooth-walled bore 58 extends from the bore 54 into communication with the recess 16. In addition a radial bore 60 is provided in the housing 12 in communication with the bore 54, and a suitable nipple or sleeve 62 is welded or otherwise secured to the outer periphery of the housing 12 surrounding the port or bore 60. The nipple 62 extends substantially radially outwardly from the housing 12 and may be connected with an auxiliary or secondary pipe line or flow line (not shown) in any well known manner.

A safety valve generally indicated at 64 is threadedly secured within the bore 54 and comprises a main valve body 66 having the outer periphery thereof threaded for engagement with the threads of the bore 54. The body 66 is of a reduced diameter at 68 for slidable insertion within the bore 58 for a purpose as will be hereinafter set forth. An inwardly directed shoulder 69 is provided on the inner periphery of the neck 68 to provide a valve seat. A suitable valve cage member 70 is secured to the neck 68 in any well known manner, and a ball member 72 is loosely disposed therein for cooperation with the valve seat 69 to provide alternate open and closed positions for the valve 64. The open position for the valve 64 is shown in solid lines in FIG. 2, and the closed position thereof is indicated in dashed lines. A centrally disposed passageway 74 extends through the valve body 66 for passage of fluid therethrough, and it is to be noted that the inner periphery of at least the upper portion of the bore 74, as viewed in FIG. 2, if of a hexagonal configuration whereby a suitable tool, such as an Allen wrench, or the like, may be utilized for threadedly installing the valve 64 in the bore 54, as will hereinafter be more fully set forth.

An annular locking ring 76, having the outer periphery thereof threaded for engagement with the threads of the bore 54 is inserted within the bore 54 at a preselected position above the valve 64 as viewed in the drawings for a purpose as will be hereinafter set forth. The inner diameter of the locking ring 76 is greater than the largest cross-sectional dimension of the valve body 66 in order that the tool (not shown) used for adjusting the position of the valve 64 may be inserted through the locking ring 76 for engagement with the bore 74. In addition, a diametrically extending groove or recess 78 is provided in the outer or exposed surface of the locking ring 76 in order that a setting tool 73 (FIGS. 9 and 10) may be utilized for positioning the locking ring 76 within the bore 54, as will be hereinafter set forth in detail.

The setting tool 73 comprises an elongated stem 75 which may be hollow, if desired, but not limited thereto, and having an enlarged head member 77 at one end thereof and a diametrically positioned longitudinally extending lug means 79 provided at the opposite end thereof. If the stem 75 is hollow, the lug means 79 will preferably comprise a pair of diametrically opposed longitudinally extending lug members as shown in FIG. 10, whereas if the stem 75 is solid, the lug means 79 will preferably comprise a single diametrically extending longitudinally projecting lug member (not shown). The lug means 79 is particularly configured for engaging the recesss or grooves 78 of the locking ring 76 and the length of the stem 75 extending beyond the head member 77 is particularly selected for a purpose as will be hereinafter set forth.

A valve opening apparatus 80 is adjustably secured within the bore 54 and as shown herein comprises a head member 82 having the outer periphery thereof threaded for engagement with the threads of the bore 54. An elongated relatively thin spindle or opening element 84 is carried by or integral with the head member 82 and extends longitudinally within the bore 54 as particularly shown in FIG. 2. A diametrically extending recess or groove 86 is provided in the upper or outer surface of the head member 82 for engagement by a screw driver (not shown) or other suitable tool (not shown) in order to rotate the opening apparatus 80 in one direction for lowering the spindle 84 within the bore and in an opposite direction for raising the spindle 84 within the bore, as viewed in the drawings. When it is desired to positively retain the ball member 72 in a lowered or open position within the cage 70, the opening apparatus 80 may be lowered within the bore 54 a sufficient distance for bringing the outer extremity of the spindle member 84 into engagement with the ball 72, and for lowering the ball 72 and for lowering the ball 72 to its lowermost position within the cage 70, or at least to a position away from the valve set 69 for opening of the valve 64. When it is no longer necessary to positively retain the ball 72 in the open position thereof, the opening apparatus 80 may be raised within the bore 54 a sufficient distance to preclude interference with the normal flow of fluid through the valve 64 as shown in FIG. 2, and as will be hereinafter set forth in detail.

A seal plug 88 generally similar to the plug 44 and having suitable sealing means 90 provided around the outer periphery thereof is preferably inserted in the bore 54 for precluding accidental leakage of fluid from the bore during operation of the valve 64. Of course, it is preferable to provide a threaded portion 92 on the outer periphery of the housing 12 in the proximity of the outer extremity thereof for receiving a threaded cap or protector member 94 thereon, as is well known.

When it is desirable to connect a secondary or auxiliary flow line (not shown) with a main flow line 14 in order to provide communication of fluid therebetween, the combined safety valve and punch tee fitting 10 may be welded or otherwise secured to the outer periphery of the pipe or flow line 14 in such a manner that the sleeve 62 may be suitably connected with the secondary or auxiliary line. The valve 64 may then be inserted into the bore 54 by engaging the hexagonal bore 74 with a suitable tool (not shown) and rotating the body 66 in a direction for moving the valve 64 in a direction toward the shoulder 56. It may be preferable to move the body 66 through a sufficient distance within the bore 54 for engagement with the shoulder 56, but not limited thereto.

The locking ring 76 may then be inserted within the bore 54 and moved in a direction toward the valve 64 by engaging the recesses 78 by the lugs 79 of the setting tool 73. The length of the stem 75 is particularly selected whereby the head 77 will engage the outer end of the housing 12 for precluding further movement of the locking ring 76 when the preselected position for the locking ring 76 within the bore 54 has been reached. This preselected position for the locking ring 76 may be determined by the desired length of projecting required for the cage 70 and ball 72 into the recess 16. The length of projection of the ball 72 and cage 70 into the recess 16 determines the pressure differential across the ball member 72 for closing of the ball against the valve seat 68. The flow of fluid around the ball 72 causes a vacuum on the upstream side of the ball. The closer the ball is to the restricted area of the bore 112, the greater the vacuum created on the upstream side of the ball whereby the pressure differential required for closing the valve will be relatively small, land vice versa. Thus, when the locking ring 76 has been preset within the bore 54 at the required spacing as determined by the overall length of the setting tool 75, the body 66 may be moved into engagement with the locking ring 76 by inserting the usual tool (not shown) through the locking ring 76 and engaging said tool with the hexagonal bore 74 and rotating the body 66 in the proper direction for moving the valve 64 in the proper direction within the bore 54. Thus, the valve 64 may be set within the bore 54 at the desired preselected position therefor in order that the desired or calibrated pressure differentials detected by the ball member 72 will automatically close the valve, as will be hereinafter set forth.

Subsequent to the setting of the valve 64, it is desirable to insert the opening apparatus 80 into the bore 54, and move the apparatus 80 in a direction toward the valve 64 a sufficient distance for bringing the outer extremity of the spindle 84 into engagement with the ball 72, and sufficiently further for positively retaining the ball 72 out of engagement with the valve seat 69. The seal plug 88 may then be installed at the outer end of the bore 54 for efficiently sealing the bore 54 against accidental leakage of fluid therefrom.

The punch member 24 may then be inserted into the bore 18 and rotated in one direction by inserting a suitable tool (not shown) in the hexagonal bore 38 for moving the cutting edge 30 in a direction toward the pipe or flow line 14. The punch member 24 is moved through the bore 18 sufficiently for severing the coupon 34 from the wall of the pipe 14. The severed coupon 34 is normally retained within the bore 36 by friction, and subsequent to cutting the coupon 34 from the pipe 14 the punch member 24 may be retracted to a position within the bore 18, as shown in FIG. 2, by rotating thereof in an opposite direction. Subsequent to this operation, the seal plug 44 may be installed in the outer end of the bore 18 as hereinbefore set forth for precluding leakage of fluid through the bore 18.

When the coupon 34 has been removed from thhe pipe 14 it will be apparent that communication is established between the interior of the flow line 14 and the sleeve 62 through the open valve 64 and the radial bore 60. As hereinbefore set forth, the opening apparatus 80 positively retains the ball 72 in an open position during the cutting or puncture operation. Otherwise, the fluid pressure entering the recess 16 from the interior of the pipe or flow line 14 would act on one side of the ball 72 for forcing the ball into a closed position against the valve seat 69. As soon as the flow of fluid is established through the valve and to the sleeve 62, the pressure acting on the ball 72 will be equalized, and the ball 72 will remain in its normal open position as shown in FIG. 2 by the pull of gravity thereon. When this condition occurs, the seal plug 88 may be removed, and the opening apparatus 80 may be backed off sufficiently for complete disengagement from the ball 72 and away from the valve 64, as shown in FIG. 2, for precluding interference with the flow of fluid through the valve 64. The seal plug 88 may then be reinstalled in the bore 54, and the protector cap 94 may be secured on the housing 12.

In this manner substantially constant communication is established between the main flow line 14 and the sleeve 62 and on to the auxiliary or secondary flow line (not shown). However, when a condition occurs wherein the pressure in the auxiliary line falls below a predetermined amount, or below the amount required to place a pressure differential on the ball 72 greater than that for which the valve 64 has been calibrated, the ball 72 will be forced against the valve seat 69 for automatically and quickly closing the valve 64. This precludes excessive loss of pressure fluid from the main flow line 14 until such time as the cause of the low pressure condition in the secondary line can be corrected. For example, if a break occurs in the auxiliary flow line, the pressure downstream of the ball 72 will become less than the pressure upstream from the flow line 14. The upstream pressure will quickly force the ball 72 into position against the valve seat 69 for closing the valve 64. When the break in the auxiliary line has been repaired, and it is desired to re-establish communication between the flow line 14 and the auxiliary line, the protector 94 may be removed for access to the bore 54. The seal plug 88 may be removed, and the opening apparatus 80 may be moved in a direction toward the ball 72 as hereinbefore set forth for engaging the ball 72 and retaining the ball in the open position until sufficient fluid has passed therethrough for equalizing the pressure acting on the ball. The opening apparatus 80 may then be backed off to the out-of-the-way position in the bore 54, and the seal plug 88 may be reinstalled therein. Of course, the protector 94 may be replaced on the housing 12, and the communication will be once again established between the flow line 14 and the secondary flow line.

Referring now to FIG. 5, a modified safety valve and punch tee fitting is generally indicated at 100 which comprises a housing 102 generally similar to the housing 12, and adapted to be welded or otherwise secured to the outer periphery of the flow line 14. One end of the housing 102 is provided with a recess 104 similar to the recess 16, and a first threaded bore 106 similar to the bore 18 extends longitudinally through the housing 102 into communication with the recess 104 through a smooth-walled reduced diameter bore 108, which is similar to the bore 22. The bore 106 is provided for receiving the punch member 24 therein, as hereinbefore set forth and for the same purpose. Of course, a seal plug 44 may be utilized in combination with the punch member 24 in the bore 106, but is eliminated from FIG. 5 for purposes of illustration.

A substantially L-shaped passageway having one leg 112 threaded and in communication with the recess 104, and the other leg 114 thereof extending radially through the wall of the housing 102 to provide communication with a sleeve 116 similar to the sleeve 62. A valve 118 generally similar to the valve 64 is adjustably disposed in the threaded bore portion 112, and as shown in FIG. 5 comprises a main valve body 120 having the outer periphery thereof threaded for engagement with the threads of the bore 112. A central bore 122 extends through the body 120 and is preferably beveled at one end thereof to provide a valve seat 124. A suitable cage member 126 having a ball 128 loosely disposed therein is carried by the body 120, and as particularly shown in FIG. 5, gravity maintains the ball 128 in a normal position away from the valve seat 124 to provide a normal open position for the valve 118. It will be apparent that the cross-sectional configuration of the bore 122 may be square, hexagonal, or the like, whereby a suitable tool (not shown) may be inserted therein for rotating the body 120 in order to facilitate inserting of the valve 118 within the threaded bore portion 112. It will be further apparent that the valve 118 must be inserted into the bore 112 through the recess 104, and thus must be installed within the housing 102 prior to welding of the fitting 100 onto the pipe or flow line 14. In some instances, the heat of the welding process may affect the relative dimensions of the valve body 120 and the bore 112, and hinder any future adjustments of the position of the valve 118 within the bore 112.

A threaded bore 130 is provided in the housing 102 in substantial axial alignment with the bore 112 and extends from the outer end of the housing 102 in a direction toward the radial bore 114 into communication with a reduced diameter smooth-walled bore 132 which extends into communication with the bore 114. The opening apparatus 80 may be installed in the threaded bore 130 in such a manner that the spindle member 84 will extend through the reduced bore 132 for selective engagement with the ball member 128 in order to positively retain the ball 128 in an open position when desired. Of course, a seal plug 88 may also be utilized in the bore 130, if desired, but is eliminated from FIG. 5 for purposes of illustration.

The operation of the safety valve and punch tee fitting 100 is substantially identical with the operation of the fitting 10. The punch member 24 may be utilized as hereinbefore set forth for severing the coupon 34 from the pipe 14 and retaining the coupon 34 within the bore 36. When the punch member 24 has been retracted within the bore 106, communication is established between the interior of the flow line 14 and the sleeve 116 through the valve 118 which is held open by the opening apparatus 80 (not shown in FIG. 5 for purposes of illustration). When the pressure acting on the ball 128 has been equalized by sufficient flow of fluid through the valve 118, the opening apparatus 80 may be retracted, and substantially constant communication is established between the main flow line 14 and the secondary flow line (not shown). When there is sufficient pressure drop in the secondary flow line, the safety valve 118 will automatically and quickly close for precluding loss of pressure fluid from the main flow line 14 as hereinbefore set forth.

Referring now to FIG. 6, still another embodiment of the invention is shown wherein a combined safety valve and punch tee fitting is generally indicated at 134, and is particularly designed for use with pipes or flow lines 14 having relatively small diameters. In a small diameter pipe it is important that the punching or severing of the coupon therefrom be substantially on a diameter and extend radially inwardly. In other words, the axis of the punch should preferably be in substantial alignment with a diameter of the cross section of the pipe being cut whereby the punch moves radially with respect to the cross section of the pipe during a severing operation. Therefore, it may be desirable to provide a housing 12a similar to the housing 12 and having bores 18a and 54a generally similar to the bores 18 and 54 extending therethrough and a sleeve 62a similar to the sleeve 62 secured thereto. The bore 18a is provided for receiving the punch member 24 therein in the manner as hereinbefore set forth, and whereas it may be preferable to also provide the seal plug 44 therein, the plug 44 is omitted from FIG. 6 for purposes of illustration. The valve 64, opening apparatus 80 and plug 88 are disposed in the bore 54a in the manner as hereinbefore set forth, and for the same purpose. However, the longitudinal axis of at least one of the bores, for example the bore 18a, is angularly disposed with respect to the longitudinal axis of the housing 12 instead of being off-set and parallel thereto as in the case of the bores 18 and 54 whereby the cutting element 30 of the punch member 24 will be positioned substantially at a diameter of the pipe 14 and in alignment therewith, and will move substantially radially inwardly during the coupon cutting operation. It is important, of course, that the bores 18a and 54a be open to a common recess area, such as indicated in dotted lines at 136 in FIG. 6 in order that the cutting of the pipe 14 by the punch member 24 will open communication between the interior of the pipe 14 and the sleeve 62a through the safety valve 64 as hereinbefore set forth and for the same purpose.

Referring now to FIGS. 7 and 8, a safety valve fitting generally indicated at 138 is shown which comprises a housing or sleeve member 140 having one sleeve 142 integral therewith or secured thereto and extending at right angles therefrom, and a second sleeve 144 welded or otherwise secured to the outer periphery thereof in longitudinally and circumferentially spaced relationship to the first sleeve 142 for a purpose as will be hereinafter set forth. A centrally disposed threaded bore 146 extends into the sleeve 140 to an inwardly directed annular shoulder 148 which is conterminous with a reduced diameter smooth-walled bore 150. The bore 150 extends into communication with a bore 152 which is substantially perpendicular thereto and which extends through the sleeve 142. The bore 146 is enlarged at 154 for a purpose as will be hereinafter set forth. In addition, a radial bore or port 156 is provided in the sidewall of the sleeve 140 to provide communication between the bore 146 and the interior of the sleeve 144.

The valve 64 is adjustably installed within the bore 146 in the manner as hereinbefore set forth, and the calibrated position therefor is determined by the lock ring 76 as hereinbefore set forth. The opening apparatus 80 is also installed in the enlarged bore portion 154 as is the seal plug 88. It is to be noted that the sealing means or O-rings 90 are disposed in the inner periphery of the enlarged bore portion 154 and engages the outer periphery of the plug 88. However, the seal ring 90 may be disposed on the outer periphery of the plug 88 and engage the bore 154, if desired.

The safety valve fitting 138 may be interposed between substantially any two flow lines wherein it is desired to provide an automatic closing of one line upon the loss of fluid pressure in the other line. The sleeve 142 may be suitably connected with the first flow line, which is to be protected against accidental loss of fluid, and the second flow line may be suitably connected with the sleeve 144. In order to initially establish fluid flow from the sleeve 142 to the sleeve 144, the ball member 70 may be positively retained in an open position by the opening apparatus 80 as hereinbefore set forth. As soon as sufficient fluid flow has been established through the valve 64, the pressure on the ball 72 will be equalized and gravity will maintain the ball 72 in the open position therefor. In the event of a break or the like in the second flow line wherein there is sufficient pressure drop across the ball 72 the ball 72 will be quickly moved into a closed position against the valve seat 69 for precluding loss of fluid from the first flow line. Of course, in order to re-establish communications between the two flow lines, the procedure must be repeated as hereinbefore set forth.

From the foregoing it will be apparent that the present invention provides a novel safety valve fitting or combination safety valve and punch tee fitting adapted to be interposed between two flow lines, said safety valve providing an automatic closing of the communication between the flow lines in the event of a pressure drop in the secondary flow line, thus precluding accidental loss of fluid from the main flow line. The novel fitting includes a ball and cage type safety valve having a normal open position, but responsive to precalculated pressure differentials acting thereon for quickly and automatically closing the valve for precluding escape of the pressure fluid. The novel device is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A safety valve fitting adapted to be interposed between two flow lines comprising:
    an upright housing having a top and a bottom, the bottom having communication with one flow line, the housing having a side outlet communicating with the other flow line, the housing having a vertical chamber between the top and bottom, the upper portion of the chamber being internally threaded, the lower portion of the housing having a cavity therein larger in diameter than the chamber;
    a maximum flow rate control valve threadably positioned in said chamber, the valve having a valve body and a valve seat therein and a ball supported by a cage below the valve seat, the valve cage extending at least partially within said housing cavity, the position of said cage portion of said valve in said cavity serving to regulate the maximum flow rate before said ball is forced against said seat to close against further flow.

2. A safety valve fitting as set forth in claim 1 including adjustable means comprising an annular locking ring threadably disposed in said housing chamber and a setting tool engagable with said locking ring for positively positioning said locking ring within said housing chamber at a preselected position whereby the valve body may be disposed in engagement with said locking ring for setting said valve body in said chamber to provide flow rate calibration for the actuation of the valve.

3. A safety valve fitting as set forth in claim 2 wherein the setting tool means comprises a stem of a predetermined length, a head portion provided at one end of said stem, a lug portion provided at the opposite end of said stem for engagement with said locking ring, said head portion being engagable with said housing top for limiting the movement of said stem means in one direction for providing said positive positioning of the locking ring.

4. A safety valve fitting as set forth in claim 1 including seal plug means secured in said housing chamber upper end for precluding leakage therefrom.

5. A safety valve fitting as set forth in claim 1 including punch means movably secured in said housing and operable for severing one flow line for providing communication between said two flow lines.

6. A safety valve fitting as set forth in claim 5 wherein said housing means is provided with a second vertical chamber extending substantially longitudinally therein for receiving said punch means therein, both of said chambers being in communication with said cavity in said housing lower portion.

* * * * *